(12) United States Patent
Tanaka et al.

(10) Patent No.: US 10,275,097 B2
(45) Date of Patent: Apr. 30, 2019

(54) INTERACTIVE PROJECTOR, INTERACTIVE PROJECTION SYSTEM, AND INTERACTIVE PROJECTOR CONTROL METHOD

(71) Applicant: SEIKO EPSON CORPORATION, Tokyo (JP)

(72) Inventors: Kenji Tanaka, Trondheim (NO); Karol Marcin Pawlak, Trondheim (NO); Tormod Njolstad, Trondheim (NO)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/559,365

(22) PCT Filed: Mar. 18, 2016

(86) PCT No.: PCT/JP2016/001606
§ 371 (c)(1),
(2) Date: Sep. 18, 2017

(87) PCT Pub. No.: WO2016/157807
PCT Pub. Date: Oct. 6, 2016

(65) Prior Publication Data
US 2018/0074654 A1 Mar. 15, 2018

(30) Foreign Application Priority Data
Mar. 27, 2015 (JP) .................... 2015-065669

(51) Int. Cl.
*G06F 3/02* (2006.01)
*G06G 5/00* (2006.01)
*G06F 3/033* (2013.01)
*G09G 5/08* (2006.01)
*G06F 3/042* (2006.01)
(Continued)

(52) U.S. Cl.
CPC ............ *G06F 3/0425* (2013.01); *G06F 3/017* (2013.01); *G06F 3/038* (2013.01); *G06F 3/0325* (2013.01);
(Continued)

(58) Field of Classification Search
CPC .......... G06F 3/017; G06F 3/0304; G06F 3/011
See application file for complete search history.

(56) References Cited

U.S. PATENT DOCUMENTS 8,436,836 B2 5/2013 Njolstad et al.
2002/0021287 A1* 2/2002 Tomasi ................ G06F 1/1613
345/168
(Continued)

FOREIGN PATENT DOCUMENTS

JP 2008-520034 A 6/2008
JP 2012-150636 A 8/2012

OTHER PUBLICATIONS

May 17, 2016 International Search Report issued in International Patent Application No. PCT/JP2016/001606.
(Continued)

*Primary Examiner* — Nan-Ying Yang
(74) *Attorney, Agent, or Firm* — Oliff PLC (57) ABSTRACT

An interactive projector includes a projection unit that projects the projected screen on a screen surface, a plurality of cameras that include a first camera and a second camera capturing an image of an area of the projected screen, a position detection unit that detects a three-dimensional position of the pointing element with respect to the projected screen based on a plurality of images including the pointing element of which the image is captured by the plurality of cameras, and a contact detection unit that detects contact with the projected screen of a pointing element, and the contact detection unit detects contact of the self-light emitting pointing element with the projected screen based on the light emitting pattern and detects contact of the non-light-emitting pointing element with the projected screen based on the three-dimensional position detected by the position detection unit.

4 Claims, 6 Drawing Sheets

(51) Int. Cl.
*G06F 3/0346* (2013.01)
*G06F 3/01* (2006.01)
*G06F 3/03* (2006.01)
*G06F 3/038* (2013.01)
*G06F 3/0481* (2013.01)
*G06F 3/0488* (2013.01)
*G06F 3/0354* (2013.01)

(52) U.S. Cl.
CPC .......... *G06F 3/0346* (2013.01); *G06F 3/0383* (2013.01); *G06F 3/03542* (2013.01); *G06F 3/03545* (2013.01); *G06F 3/0481* (2013.01); *G06F 3/04883* (2013.01); *G06F 2203/04101* (2013.01)

(56) References Cited

U.S. PATENT DOCUMENTS

2003/0234346 A1 12/2003 Kao
2013/0162538 A1* 6/2013 Ichieda .................. G06F 3/033
                                                                    345/163
2014/0160076 A1 6/2014 Ichieda
2014/0192089 A1 7/2014 Honda et al.

OTHER PUBLICATIONS

Sep. 14, 2018 Search Report issued in European Patent Application No. 16771700.8.

* cited by examiner

INTERACTIVE PROJECTOR, INTERACTIVE PROJECTION SYSTEM, AND INTERACTIVE PROJECTOR CONTROL METHOD

TECHNICAL FIELD

The present invention relates to an interactive projector capable of receiving an instruction by a pointing element of a user with respect to a projected screen and a system thereof.

BACKGROUND ART

In PTLs 1 and 2, a projection type display device (projector) which projects a projected screen on a screen and captures an image including an object such as a finger or a pen which emits light by a camera so as to make it possible to detect a position of the object using the captured image is disclosed. The object such as the finger is used as the pointing element for giving an instruction to the projected screen. That is, when a tip of the object is in contact with the screen, the projector recognizes that a predetermined instruction such as rendering is input to the projected screen and re-renders the projected screen according to the instruction. Accordingly, the user is able to input various instructions by using the projected screen as a user interface. As such, a type of projector capable of using the projected screen on the screen as a user interface by which input can be made is called an "interactive projector". An object used for giving an instruction to the projected screen is called a "pointing element".

CITATION LIST

Patent Literature

PTL 1: JP-A-2012-150636
PTL 2: JP-T-2008-520034

SUMMARY OF INVENTION

Technical Problem

In a typical interactive projector, it is determined whether the instruction is given by the pointing element or not according to whether the tip of the pointing element is in contact with the screen or not. Contact of the pointing element can be detected based on a distance between the tip of the pointing element and the screen. However, in an interactive projector having a configuration in which a three-dimensional position of the tip of the pointing element is detected using a plurality of cameras, in a case where a pen which emits light is used as the pointing element, light emitted by the pen is reflected on a screen surface in a state where the pen is in contact with the screen surface and thus, detection accuracy of the tip position of the pen was not high and detection accuracy of contact of the pen was not enough. For that reason, it was desirable to improve detection accuracy of contact of a self-light emitting pointing element such as the pen which emits light.

Solution to Problem

The invention is intended to solve at least some of the problems described above and can be realized by the following aspects or application examples.

(1) According to an aspect of the invention, there is provided an interactive projector receiving an instruction by a pointing element of a user with respect to a projected screen. The interactive projector simultaneously uses both of a self-light emitting pointing element including a light-emitting portion which emits pointing element signal light in different light emitting patterns between at the time of contacting the projected screen and at the time of non-contacting the projected screen and a non-light-emitting pointing element which does not include the light-emitting portion as the pointing element, and the interactive projector includes a projection unit that projects the projected screen on a screen surface, a plurality of cameras including a first camera and a second camera that capture an image of an area of the projected screen, a position detection unit that detects a three-dimensional position of the pointing element with respect to the projected screen based on a plurality of images including the pointing element of which the image is captured by the plurality of cameras, and a contact detection unit that detects contact of the pointing element with the projected screen, and the contact detection unit executes detection of contact of the self-light emitting pointing element with the projected screen based on the light emitting pattern and executes detection of contact of the non-light-emitting pointing element with the projected screen based on the three-dimensional position detected by the position detection unit.

In the interactive projector, contact of the pointing element with the projected screen is detected with different methods between the self-light emitting pointing element and the non-light-emitting pointing element. Detection of contact of the self-light emitting pointing element with the projected screen is executed based on the light emitting pattern and thus, it is possible to improve detection accuracy of contact of the pointing element with the projected screen.

(2) In the interactive projector described above, a detection light irradiation unit that irradiates the projected screen with detection light used for detection of the non-light-emitting pointing element is further included and the plurality of cameras may receive light in a wavelength region including wavelengths of the pointing element signal light and the detection light and capture an image of the area of the projected screen.

According to the configuration, it is possible to easily and accurately detect the non-light-emitting pointing element using, for example, near-infrared light as detection light. The interactive projector includes the detection light irradiation unit to thereby make it possible for the projector to easily control an irradiation timing of detection light by associating the irradiation timing with an image-capturing timing by a camera.

(3) In the interactive projector described above, the detection light irradiation unit intermittently may irradiate the projected screen with the detection light and the position detection unit may determine the self-light emitting pointing element and the non-light-emitting pointing element based on a first image captured in a first period during which irradiation of the detection light is performed and a second image captured in a second period during which irradiation of the detection light is not performed.

According to the configuration, detection light is intermittently irradiated and thus, it is possible to easily determine the self-light emitting pointing element and the non-light-emitting pointing element based on an image corresponding to the presence or absence of irradiation of detection light.

The invention can be realized by various aspects, for example, a system including a self-light emitting pointing element, a plane or curved surface screen, and an interactive projector, a control method or a control device of the interactive projector, a computer program for realizing functions of the method or device, and a non-transitory storage medium in which the computer program is stored.

DESCRIPTION OF EMBODIMENTS

A1. Outline of System

Figure 1:
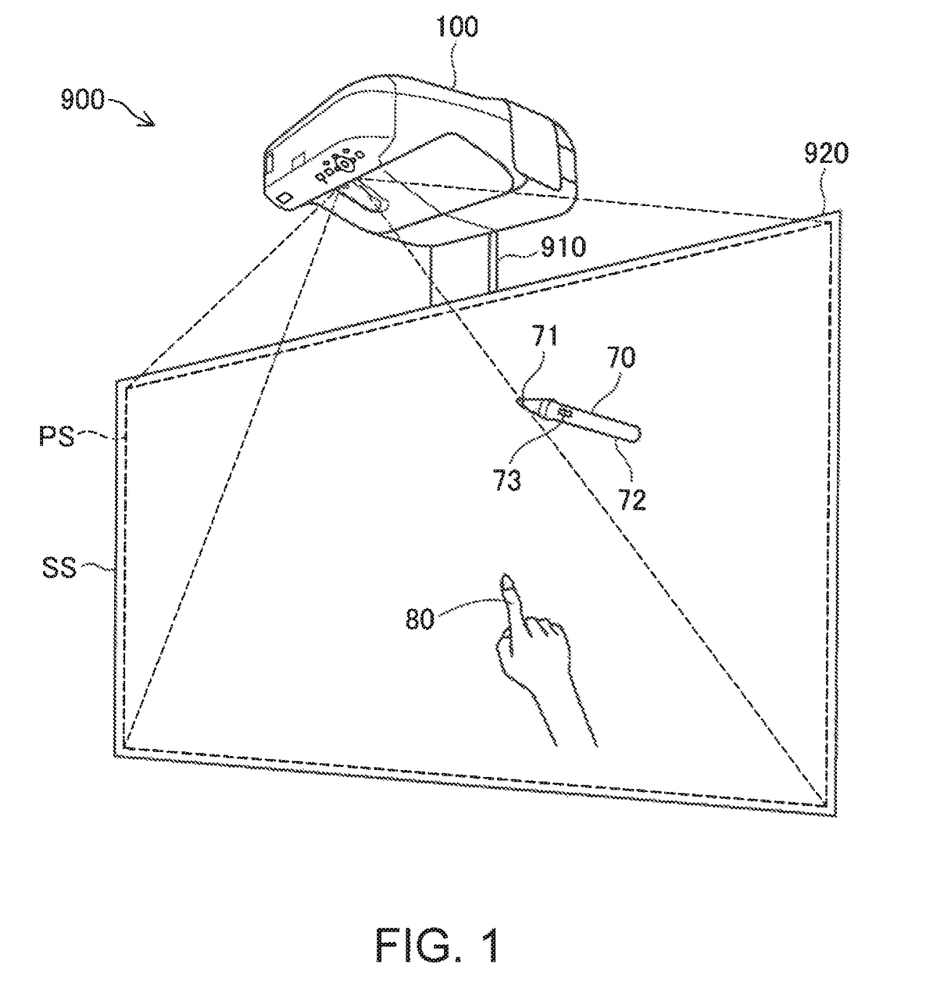
FIG. 1 is a perspective view of an interactive projection system.

FIG. 1 is a perspective view of an interactive projection system 900 according to an embodiment of the invention. The system 900 includes an interactive projector 100, a screen plate 920, and a self-light emitting pointing element 70. A front surface of the screen plate 920 is used as a projection screen surface SS. The projector 100 is fixed to the front and above the screen plate 920 by a support member 910. In FIG. 1, although the projection screen surface SS is arranged vertically, the system 900 in which the projection screen surface SS is arranged horizontally can also be used.

The projector 100 projects a projected screen PS on the projection screen surface SS. The projected screen PS normally includes an image rendered within the projector 100. In a case where the image rendered within the projector 100 is not present, the projected screen PS is irradiated with light from the projector 100 and a white-colored image is displayed on the projected screen PS. In the present specification, a "projection screen surface SS" (or "screen surface SS") means a surface of a member on which an image is projected. The "projected screen PS" means an area of the image projected on the projection screen surface SS by the projector 100. Normally, the projected screen PS is projected on a portion of the projection screen surface SS.

The self-light emitting pointing element 70 is a pen type pointing element including a tip portion 71 capable of emitting light, a shaft portion 72 held by a user, and a button switch 73 provided on the shaft portion 72. A configuration and function of the self-light emitting pointing element 70 will be described later. In the system 900, one or a plurality of self-light emitting pointing elements 70 can be used together with one or a plurality of non-light-emitting pointing elements 80 (non-light-emitting pen, finger, or the like).

In the following, in a case where the self-light emitting pointing element 70 and the non-light-emitting pointing element 80 are not distinguished with each other, the elements are also called simply a pointing element 780.

Figure 2A:
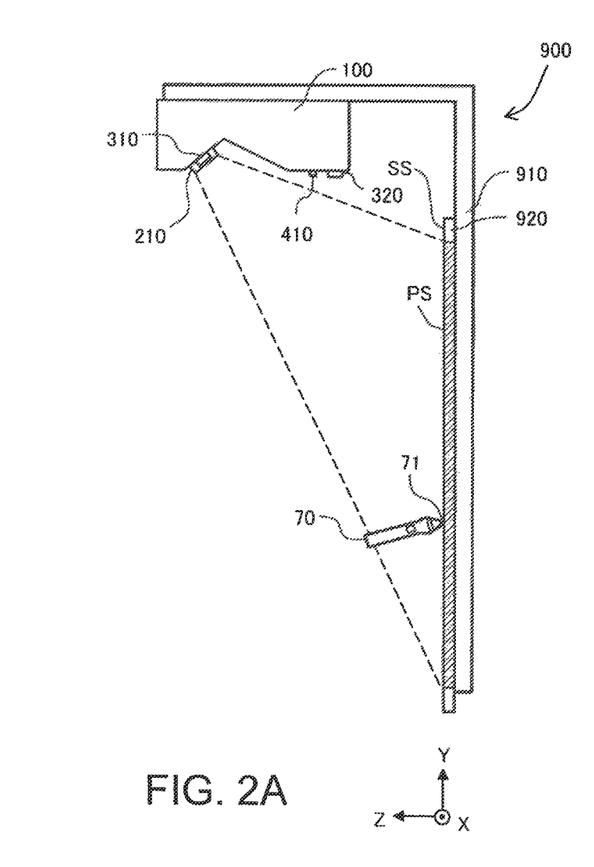
FIG. 2A is a side view of an interactive projection system.
Figure 2B:
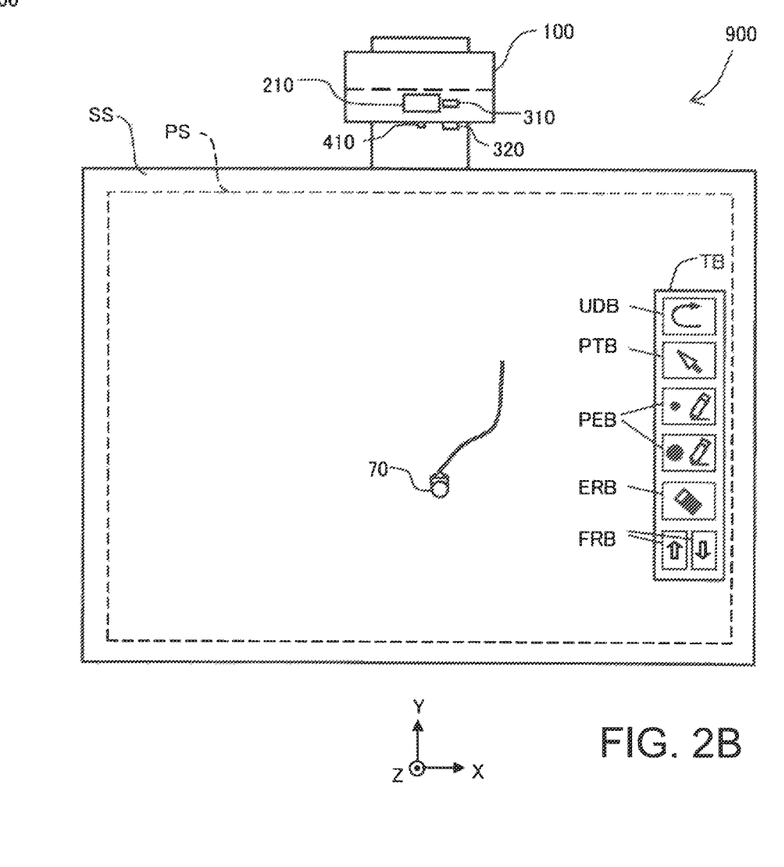
FIG. 2B is a front view of an interactive projection system.

FIG. 2A is a side view of the interactive projection system 900 and FIG. 2B is a front view thereof. In the present specification, a direction along the left and right of the screen surface SS is defined as the X direction, a direction along the up and down of the screen surface SS is defined as the Y direction, and a direction along the normal direction of the screen surface SS is defined as the Z direction. For convenience of explanation, the X direction is also called a "left and right direction", the Y direction is also called an "up and down direction", and the Z direction is also called a "front and rear direction". A direction, in which the projected screen PS exists, of the Y direction (up and down direction), when viewed from the projector 100 is called a "down direction". In FIG. 2A, for convenience of illustration, a range of the projected screen PS of the screen plate 920 is hatched.

The projector 100 includes a projection lens 210 projecting the projected screen PS on the screen surface SS, a first camera 310 and a second camera 320 that capture an image of an area of the projected screen PS, and a detection light irradiation unit 410 for illuminating a pointing element 780 with detection light. As detection light, for example, near-infrared light is used. Two cameras 310 and 320 have at least a first image-capturing function of receiving light in a wavelength region which includes a wavelength of detection light and capturing an image. At least one of two cameras 310 and 320 has a second image-capturing function of receiving light including visible light and capturing an image, and it is preferable that the two image-capturing functions are configured to be switchable. It is preferable that for example, a near-infrared filter which shields visible light and transmits only near-infrared light is arranged ahead of a lens in the two cameras 310 and 320 or a near-infrared filter switching mechanism (not illustrated) capable of being retreated from ahead of the lens is provided in each of the two cameras 310 and 320. Positions of two cameras 310 and 320 in the left and right direction (X direction) are the same and two cameras 310 and 320 are arranged by being aligned with a predetermined distance in the front and rear direction (Z direction). Two cameras 310 and 320 are not limited to the present embodiment. For example, positions of two cameras 310 and 320 in the front and rear direction (Z direction) are the same and two cameras 310 and 320 are arranged by being aligned with a predetermined distance in the left and right direction (X direction). Also, positions in all of the X, Y, and Z directions may be different from each other. When two cameras are arranged by varying the position in the Z direction (being deviated in the front and rear direction), accuracy of the Z coordinate in calculating a three-dimensional position by triangulation is high and thus, it is a preferable configuration.

In an example of FIG. 2B, a situation in which the interactive projection system 900 operates in a whiteboard mode is illustrated. The whiteboard mode is a mode at which a user is able to arbitrary perform rendering on the projected screen PS using the self-light emitting pointing element 70 or the non-light-emitting pointing element 80. The projected screen PS including a toolbox TB is projected on the screen surface SS. The toolbox TB includes a cancel button UDB for restoring processing, a pointer button PTB for selecting a mouse pointer, a pen button PEB for selecting a pen tool for rendering, an eraser button ERB for selecting an eraser tool to erase a rendered image, and a forward/rearward button FRB for allowing a screen to be advanced to a next screen or returned to a previous screen. The user is able to touch the buttons using the pointing element so as to make it possible to perform processing according to the touched button or select a tool. Immediately after the activation of the system 900, the mouse pointer may be selected as a default tool. In the example of FIG. 2B, a situation is rendered, in which in a state where the tip portion 71 of the self-light emitting pointing element 70 is in contact with the screen surface SS after the user selects the pen tool, the tip portion 71 is moved within the projected screen PS such that a line is being rendered within the projected screen PS. Rendering of the line is performed by a projection image preparation unit (which will be described later) inside the projector 100.

The interactive projection system 900 is also operable at a mode other than the whiteboard mode. For example, the system 900 is also operable at a PC interactive mode at which an image of data transferred via a communication line from a personal computer (not illustrated) is displayed on the projected screen PS. In the PC interactive mode, for example, an image of data of spreadsheet software or the like can be displayed and input, preparation, correction, or the like of data becomes possible using various tools or icons displayed within the image.

Figure 3:
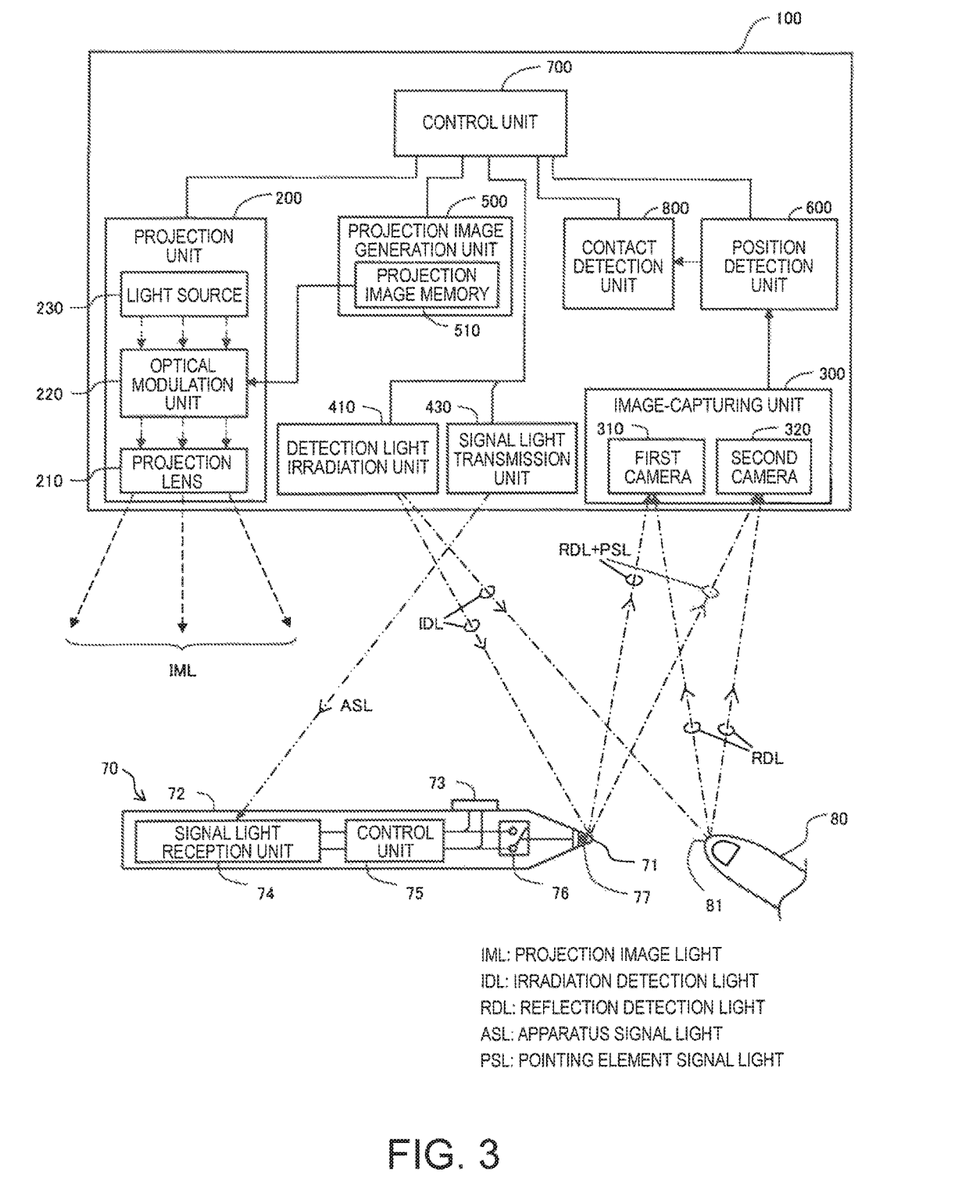
FIG. 3 is a block diagram illustrating internal configurations of the interactive projector and a self-light emitting pointing element.

FIG. 3 is a block diagram illustrating internal configurations of the interactive projector 100 and the self-light emitting pointing element 70. The projector 100 includes a control unit 700, a projection unit 200, a projection image generation unit 500, a position detection unit 600, a contact detection unit 800, an image-capturing unit 300, a detection light irradiation unit 410, and a signal light transmission unit 430.

The control unit 700 controls respective units inside the projector 100. The control unit 700 determines a content of an instruction performed on the projected screen PS by the pointing element 780 based on the three-dimensional position of the pointing element 780 detected by the position detection unit 600 and contact detection of the pointing element 780 by the contact detection unit 800 and instructs the projection image generation unit 500 to prepare or change the projected image according to the content of the instruction.

The projection image generation unit 500 includes a projection image memory 510 storing the projected image and has a function of generating the projected image projected on the screen surface SS by the projection unit 200. Also, the projection image generation unit 500 preferably has a function as a keystone correction unit correcting a trapezoidal distortion of the projected screen PS (FIG. 2B).

The projection unit 200 has a function of projecting the projected image generated by the projection image generation unit 500 on the screen surface SS. The projection unit 200 includes an optical modulation unit 220 and a light source 230, in addition to the projection lens 210 described in FIG. 2. The optical modulation unit 220 modulates light from the light source 230 according to projected image data, which is given from the projection image memory 510, to form projection image light IML. Projection image light IML is typically color image light including visible light of three colors of RGB and is projected on the screen surface SS by the projection lens 210. As the light source 230, various light sources such as a light emitting diode or a laser diode may be adopted, in addition to a light source lamp such as an ultra-high pressure mercury lamp. A transmission type or reflection type liquid crystal panel or a digital mirror device may be adopted as the optical modulation unit 220, and the optical modulation unit 220 may be configured to include a plurality of modulation units 220 for each color light.

The detection light irradiation unit 410 irradiates the screen surface SS and a portion across space in front thereof with irradiation detection light IDL for detecting the tip portion of the pointing element 780. As irradiation detection light IDL, for example, near-infrared light is used. An irradiation timing of irradiation detection light IDL in the detection light irradiation unit 410 will be described later in detail.

The signal light transmission unit 430 has a function of transmitting apparatus signal light ASL which is a synchronizing near-infrared light signal. When the projector 100 is activated, the signal light transmission unit 430 regularly emits apparatus signal light ASL. A tip light-emitting portion 77 of the self-light emitting pointing element 70 emits pointing element signal light PSL (will be described later in detail), which is near-infrared light having a predetermined light emitting pattern (light-emitting sequence), in synchronization with apparatus signal light ASL. When position detection of the pointing element 780 is performed, the cameras 310 and 320 of the image-capturing unit 300 execute image-capturing at a predetermined timing synchronized with apparatus signal light ASL.

The image-capturing unit 300 includes the first camera 310 and the second camera 320 described in FIG. 2. As previously described, two cameras 310 and 320 have a function of receiving light in a wavelength region, which includes the wavelength of detection light, and capturing an image. In an example of FIG. 3, a situation in which irradiation detection light IDL irradiated by detection light irradiation unit 410 is reflected by the pointing element 780 and reflection detection light RDL is received and captured by two cameras 310 and 320 is rendered. Two cameras 310 and 320 also receive pointing element signal light PSL which is near-infrared light and emitted from the tip light-emitting portion 77 of the self-light emitting pointing element 70 and capture an image thereof. Image-capturing of two cameras 310 and 320 is executed in both of a first period during which irradiation detection light IDL is irradiated from the detection light irradiation unit 410 and a second period during which irradiation detection light IDL is not irradiated from the detection light irradiation unit 410.

It is preferable that at least one of two cameras 310 and 320 has a function of capturing an image using light, which includes visible light, in addition to function of capturing an image using light, which includes near-infrared light. In this case, an image of the projected screen PS projected on the screen surface SS is captured by the camera to make it possible for the projection image generation unit 500 to execute keystone correction using the image. Since a method of the keystone correction using one or more cameras is well known, description thereof will be omitted here.

The position detection unit 600 has a function of analyzing the image (in the following, also called a "captured image") captured by two cameras 310 and 320 to calculate a three-dimensional position coordinate of the tip portion of the pointing element 780 by using triangulation. In this case, the position detection unit 600 compares the captured images in the first period and the second period described above so as to determine whether an individual pointing element 780 included in the images is one of the self-light emitting pointing element 70 and the non-light-emitting pointing element 80 (details will be described later).

The contact detection unit 800 detects contact of the pointing element 780 with the projected screen PS (screen surface SS) based on an analysis result (position coordinates) of the captured image by the position detection unit 600. In the interactive projector 100 of the present embodiment, the contact detection unit 800 executes detection of contact of the self-light emitting pointing element 70 with the projected screen PS based on the light emitting pattern of pointing element signal light PSL emitted by the self-light emitting pointing element 70 and executes detection of contact of the non-light-emitting pointing element 80 with the projected screen PS based on the three-dimensional position coordinate detected by the position detection unit 600. A detection method of contact of the pointing element 780 in the contact detection unit 800 will be described later in detail.

The self-light emitting pointing element 70 is provided with a signal light reception unit 74, a control unit 75, a tip switch 76, and a tip light-emitting portion 77, in addition to a button switch 73. The signal light reception unit 74 has a function of receiving apparatus signal light ASL emitted from the signal light transmission unit 430 of the projector 100. The tip switch 76 is a switch which becomes an on state when the tip portion 71 of the self-light emitting pointing element 70 is pushed and becomes an off state when the tip portion 71 is released. The tip switch 76 is normally in the off state and becomes the on state by a contact pressure when the tip portion 71 of the self-light emitting pointing element 70 contacts with the screen surface SS. When the tip switch 76 is in the off state, the control unit 75 causes the tip light-emitting portion 77 to emit light in a specific first light emitting pattern, which indicates that the tip switch 76 is in the off state, so as to emit pointing element signal light PSL having the first light emitting pattern. On the other hand, when the tip switch 76 is in the on state, the control unit 75 causes the tip light-emitting portion 77 to emit light in a specific second light emitting pattern, which indicates that the tip switch 76 is in the on state, so as to emit pointing element signal light PSL having the second light emitting pattern. The first light emitting pattern and the second light emitting pattern are different from each other and thus, the contact detection unit 800 is able to acquire an analysis result of the images captured by two cameras 310 and 320 from the position detection unit 600 and identify whether the tip switch 76 is the on state or the off state based on the analysis result.

The button switch 73 of the self-light emitting pointing element 70 has the same function as that of the tip switch 76. Accordingly, the control unit 75 causes the tip light-emitting portion 77 to emit light in the second light emitting pattern in a state where the button switch 73 is pushed by the user and causes the tip light-emitting portion 77 to emit light in the first light emitting pattern in a state where the button switch 73 is not pushed by the user. In other words, the control unit 75 causes the tip light-emitting portion 77 to emit light in the second light emitting pattern in a state where at least one of the tip switch 76 and the button switch 73 is in the on state and causes the tip light-emitting portion 77 to emit light in the first light emitting pattern in a state where both of the tip switch 76 and the button switch 73 are in the off state.

However, the button switch 73 may be assigned a function different from the tip switch 76. For example, in a case where the button switch 73 is assigned the same function as the right click button of a mouse, when the user pushes the button switch 73, a right click instruction is delivered to the control unit 700 of the projector 100 and processing according to the instruction is executed. As such, in a case where the button switch 73 is assigned the function different from the tip switch 76, the tip light-emitting portion 77 emits light in four light emitting patterns which are different from each other according to the on/off state of the tip switch 76 and the on/off state of the button switch 73. In this case, the self-light emitting pointing element 70 is able to deliver the instruction to the projector 100 while distinguishing four combinations of the on/off states of the tip switch 76 and the button switch 73.

Figure 4A:
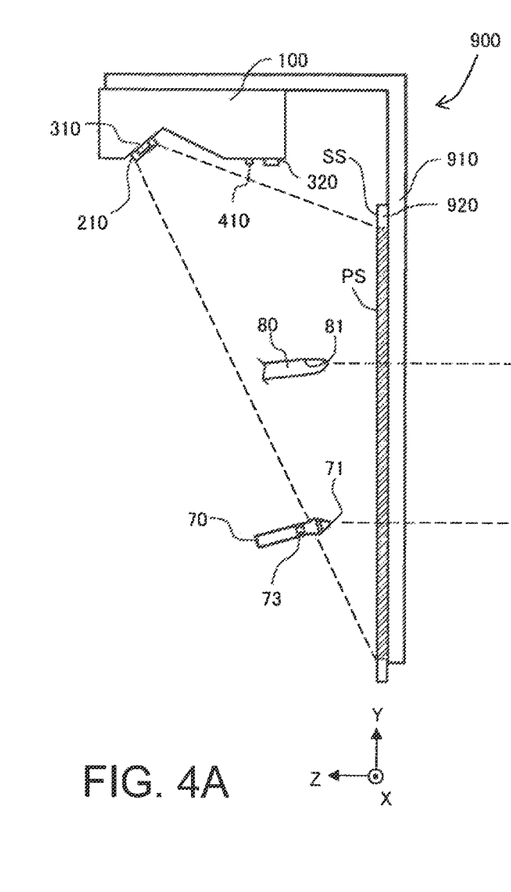
FIG. 4A is an explanatory diagram for illustrating a situation of operations using a self-light emitting pointing element and a non-light-emitting pointing element.

FIG. 4 is explanatory diagrams illustrating a situation of an operation performed using the self-light emitting pointing element 70 and the non-light-emitting pointing element 80. In this example, both the tip portion 71 of the self-light emitting pointing element 70 and the tip portion 81 of the non-light-emitting pointing element 80 are separated from the screen surface SS. The XY coordinates $(X_{71}, Y_{71})$ of the tip portion 71 of the self-light emitting pointing element 70 are on an eraser button ERB of a toolbox TB. Here, a mouse pointer PT is selected as a tool representing a function of the tip portion 71 of the self-light emitting pointing element 70 and the mouse pointer PT is rendered on the projected screen PS such that the tip $OP_{71}$ of the mouse pointer PT is present on the eraser button ERB. As previously described, the three-dimensional position of the tip portion 71 of the self-light emitting pointing element 70 is determined by triangulation using the images captured by two cameras 310 and 320. Accordingly, the mouse pointer PT is rendered on the projected screen PS in such a way that the operation point $OP_{71}$ present in the tip of the mouse pointer PT is arranged on the position of the XY coordinates $(X_1, Y_{71})$ among the three-dimensional coordinates $(X_{71}, Y_{71}, Z_{71})$ of the tip portion 71 determined by triangulation. That is, the tip $OP_{71}$ of the mouse pointer PT is arranged on the XY coordinates $(X_{71}, Y_{71})$ among the three-dimensional coordinates $(X_{71}, Y_{71}, Z_{71})$ of the tip portion 71 of the self-light emitting pointing element 70 and an instruction of the user is performed at the position. For example, in this state, the user is able to select the eraser tool by causing the tip portion 71 of the self-light emitting pointing element 70 to be brought into contact with the projected screen PS. In this state, the user is also able to select the eraser tool by pushing the button switch 73 of the self-light emitting pointing element 70. As such, in the present embodiment, also, in a case where the self-light emitting pointing element 70 is in a state of being separated from the screen surface SS, the button switch 73 is pushed so as to make it possible to give an instruction to the projector 100 according to the content of the projected screen PS in the operation point $OP_{71}$ arranged on the XY coordinates $(X_{71}, Y_{71})$ of the tip portion 71.

Figure 4B:
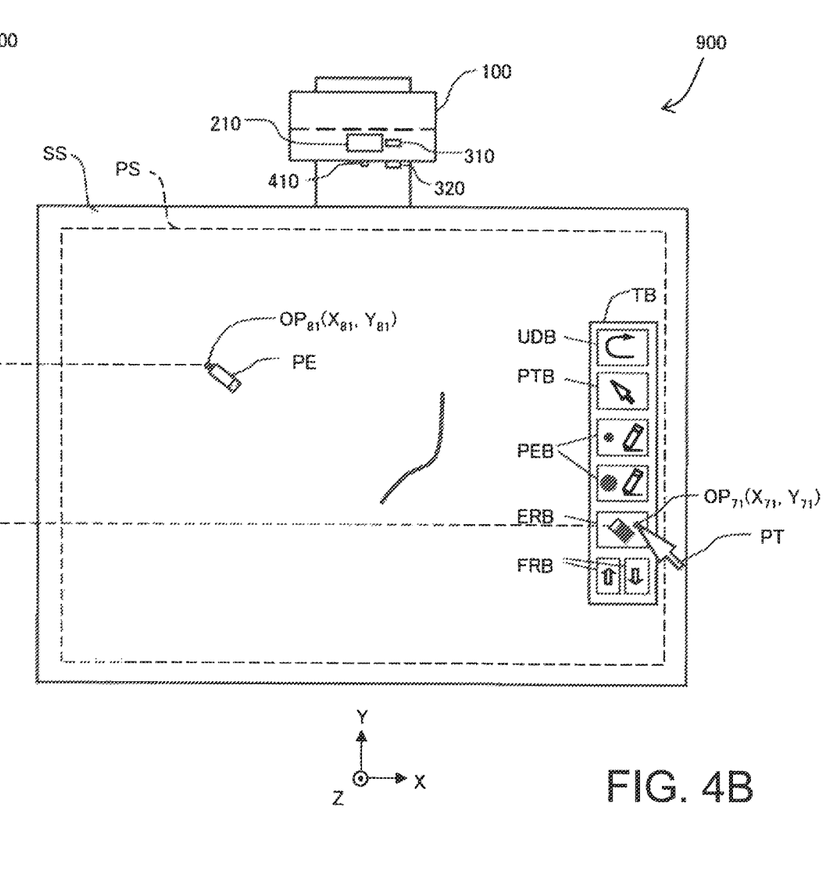
FIG. 4B is an explanatory diagram for illustrating a situation of operations using a self-light emitting pointing element and a non-light-emitting pointing element.

In FIG. 4B, a pen tool PE is selected as a tool representing a function of the tip portion 81 of the non-light-emitting pointing element 80 and the pen tool PE is rendered on the projected screen PS. As previously described, the three-dimensional position of the tip portion 81 of the non-light-emitting pointing element 80 is also determined by triangulation using the images captured by two cameras 310 and 320. Accordingly, the pen tool PE is rendered on the projected screen PS in such a way that the operation point $OP_{81}$ present in the tip of the pen tool PE is arranged on the position of the XY coordinates $(X_{81}, Y_{81})$ among the three-dimensional coordinates $(X_{81}, Y_{81}, Z_{81})$ of the tip portion 81 determined by triangulation. However, when the user gives an instruction to the projector 100 using the non-light-emitting pointing element 80, the instruction (rendering, tool selection, or the like) is performed in a state where the tip portion 81 of the non-light-emitting pointing element 80 is in contact with the projected screen PS.

In the example of FIG. 4, in a case where the tip portion of the pointing element 780 is separated from the projected screen PS, a tool (mouse pointer PT or pen tool PE) selected by an individual pointing element is rendered and displayed on the projected screen PS. Accordingly, also, in a case where the user does not put the tip portion of the pointing element in contact with the projected screen PS, there is an advantage that it is easy to understand which tool is selected by the pointing element and the operation is easy. The tool is rendered in such a way that an operation point OP of the tool is arranged at the position of the XY coordinates among the three-dimensional coordinates of the tip portion of the pointing element and thus, there is an advantage that the user is able to suitably recognize a position of a tool being used.

The interactive projection system 900 may be configured to simultaneously use a plurality of self-light emitting pointing elements 70. In this case, the light emitting patterns of the pointing element signal light PSL described above are preferably unique light emitting patterns capable of identifying a plurality of self-light emitting pointing elements 70. More specifically, in a case where it is possible to simultaneously use N (N is an integer of 2 or more) self-light emitting pointing elements 70, the light emitting patterns of pointing element signal light PSL are preferably capable of distinguishing N self-light emitting pointing elements 70. In a case where a plurality of unit light emitting periods are included in a set of light emitting patterns, it is possible to represent two values of light emission and non-light emission in one unit light emitting period. Here, one unit light emitting period corresponds to a period during which the tip light-emitting portion 77 of the self-light emitting pointing element 70 represents 1-bit information of on/off. In a case where a set of light emitting patterns is constituted with M (M is an integer of 2 or more) unit light emitting periods, $2^M$ states can be distinguished by a set of light emitting patterns. Accordingly, it is preferable that the number M of unit light emitting periods constituting a set of light emitting patterns M is set to satisfy the following expression.

$$N \times Q \leq 2^M: \qquad (1)$$

Here, Q is the number of states distinguished by the switches 73 and 76 of the self-light emitting pointing element 70, in an example of the present embodiment, Q=2 or Q=4. For example, in a case of Q=4, it is preferable that when N is set as N=2, M is set as an integer of 3 or more, and when N is set as N=3 or 4, M is set as an integer of 4 or more. In this case, the position detection unit 600 (or control unit 700) executes identification using M images respectively captured by the cameras 310 and 320 in M unit light emitting periods of a set of light emitting patterns when identifying N self-light emitting pointing elements 70 and states of the switches 73 and 76 of each self-light emitting pointing element 70. The light emitting pattern of the M-bit is a pattern obtained by setting the pointing element signal light PSL to on or off in a state where irradiation detection light IDL is maintained in the off state, and the non-light-emitting pointing element 80 is not photographed in the image captured by the cameras 310 and 320. It is preferable to further add a unit light emitting period of 1-bit, in which irradiation detection light IDL is set to the on state, in order to capture the image used for detecting the position of the non-light-emitting pointing element 80. However, the pointing element signal light PSL may be either of the on/off in the unit light emitting period for position detection. The image obtained in the unit light emitting period for position detection can also be used for position detection of the self-light emitting pointing element 70.

Specific examples of five kinds of signal light rendered in FIG. 3 are summarized as follows.

(1) Projection image light IML: It is image light (visible light) projected on the screen surface SS by the projection lens 210 in order to project the projected screen PS on the screen surface SS.

(2) Irradiation detection light IDL: It is near-infrared light with which the screen surface SS and space ahead of the screen surface SS are irradiated by the detection light irradiation unit 410 in order to detect the tip portion of the pointing element 780 (self-light emitting pointing element 70 and non-light-emitting pointing element 80).

(3) Reflection detection light RDL: It is near-infrared light reflected by the pointing element 780 (self-light emitting pointing element 70 and non-light-emitting pointing element 80) and received by two cameras 310 and 320, among near-infrared light irradiated as irradiation detection light IDL.

(4) Apparatus signal light ASL: It is near-infrared light regularly emitted from the signal light transmission unit 430 of the projector 100 in order to synchronize the projector 100 with the self-light emitting pointing element 70.

(5) Pointing element signal light PSL: It is near-infrared light emitted from the tip light-emitting portion 77 of the self-light emitting pointing element 70 at the timing synchronized with apparatus signal light ASL. The light emitting patterns of the pointing element signal light PSL are changed according to the on/off state of the switches 73 and 76 of the self-light emitting pointing element 70. The light emitting patterns also include unique light emitting patterns for identifying the plurality of self-light emitting pointing elements 70.

In the present embodiment, position detection of the tip portions of the self-light emitting pointing element 70 and the non-light-emitting pointing element 80 and determination of the content instructed by the self-light emitting pointing element 70 and the non-light-emitting pointing element 80 are respectively executed as follows.

A2. Position Detection and Contact Detection of Pointing Element

Figure 5:
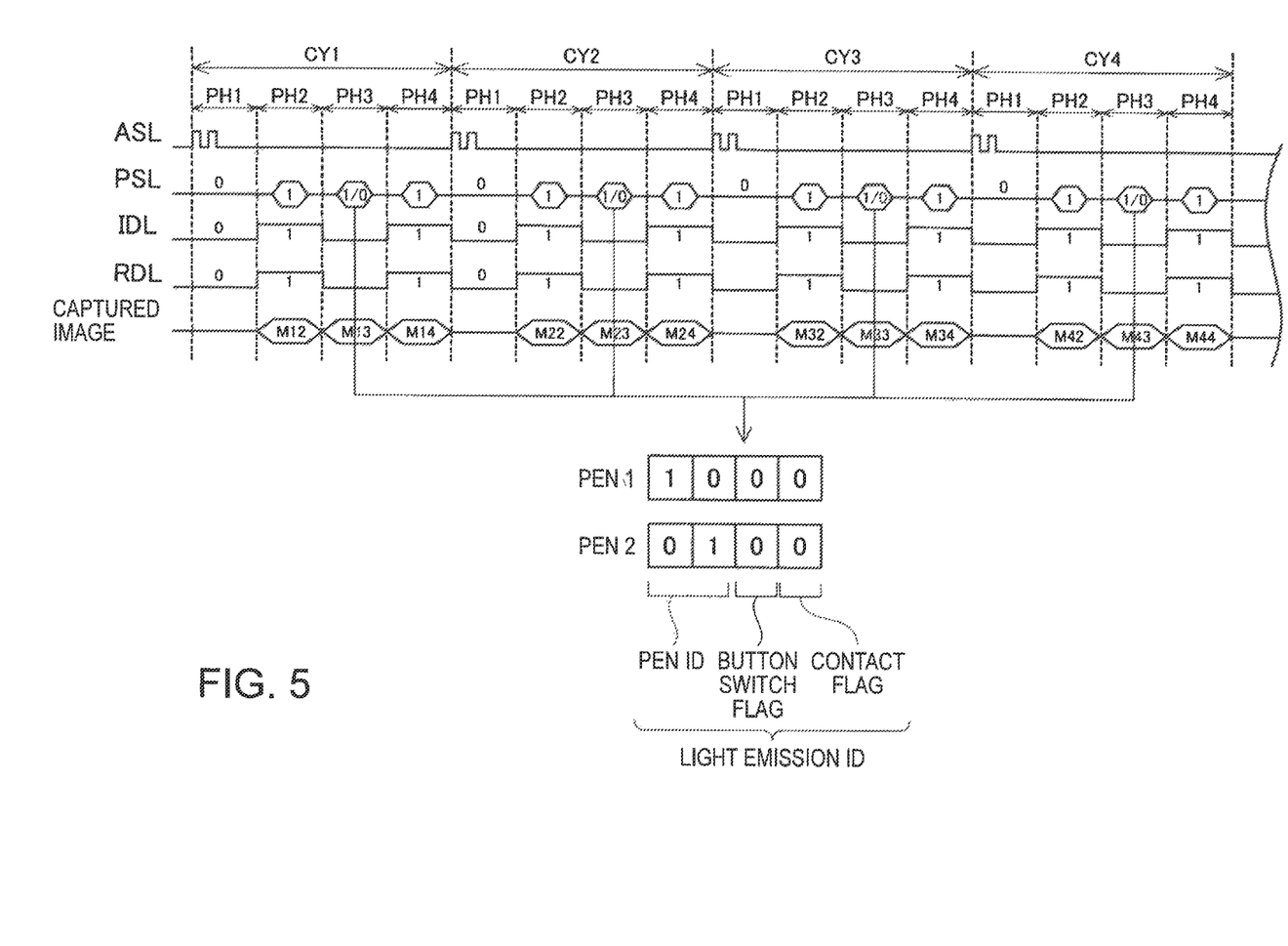
FIG. 5 is a timing chart illustrating light emission timings of a projector and a pointing element.

FIG. 5 is a timing chart illustrating light emission timings of the projector and the pointing element. In the present embodiment, position detection and contact detection (detection of contact of the tip of pointing element 780 with screen surface SS) of the pointing element 780 (self-light emitting pointing element 70 and non-light-emitting pointing element 80) are performed according to a sequence illustrated in FIG. 5, in the interactive projection system 900. The sequence illustrated in FIG. 5 includes four cycles of a first cycle CY1 to a fourth cycle CY4 and each cycle includes four phases of a first phase PH1 to a fourth phase PH4. That is, in the present sequence, the first phase PH1 to the fourth phase PH4 are repeated four times so as to make it possible to distinguish the plurality of self-light emitting pointing elements 70 and non-light-emitting pointing elements 80 and specify the positions, and to distinguish the plurality of self-light emitting pointing elements 70 and detect contact. One phase corresponds to the unit light emitting period described previously. In FIG. 5, an example in which a pen 1 and a pen 2 are used as the self-light emitting pointing element 70 is illustrated. A pen ID of the pen 1 is "10" and the pen ID of the pen 2 is "01". A pattern obtained by adding a button switch flag (OFF="0", ON="1") and a contact flag (non-contact="0", contact="1") to the pen ID is set as the light emitting pattern (light emission ID)

described above. The self-light emitting pointing element 70 emits light according to a set light emission ID in the third phase PH3. The cameras 310 and 320 of the image-capturing unit 300 execute image-capturing in synchronization with apparatus signal light ASL, in the second phase PH2, the third phase PH3, and the fourth phase PH4. In FIG. 5, a case where the button switch flag is "0" and the contact flag is "0" is illustrated.

In the present embodiment, the self-light emitting pointing element 70 and the detection light irradiation unit 410 emit light, respectively, in synchronization with apparatus signal light ASL (synchronization signal) emitted by the signal light transmission unit 430 of the interactive projector 100, in the interactive projection system 900.

When the projector 100 is activated, apparatus signal light ASL for synchronization is emitted from the signal light transmission unit 430 of the projector 100 and the first phase PH of the first cycle CY1 is started. The signal light transmission unit 430 emits apparatus signal light ASL at the start timing of the first phase PH1 of each cycle. In the present embodiment, two synchronization burst signals are emitted as apparatus signal light ASL.

When apparatus signal light ASL is received in the signal light reception unit 74, the self-light emitting pointing element 70 emits pointing element signal light PSL in the second phase PH2 and the fourth phase PH4. In the present sequence, the time of the first phase to the time of the fourth phase are set to the same time and thus, apparatus signal light ASL is received in the signal light reception unit 74, and when the start timing of the first phase is recognized, the self-light emitting pointing element 70 can recognize the start timings of the second to fourth phases.

As described above, the self-light emitting pointing element 70 emits light according to the set light emission ID in the third phase. That is, in the third phase PH3, light emission/non-light emission are different for each cycle depending on individuals of the self-light emitting pointing element 70 and the presence and absence of contact. That is, as will be described later, the third phase PH3 is a phase in which determination of individuals of the self-light emitting pointing element 70 and detection of contact of the self-light emitting pointing element 70 are performed.

The detection light irradiation unit 410 of the interactive projector 100 emits irradiation detection light IDL in synchronization with apparatus signal light ASL in the second phase PH2 and the fourth phase PH4 and does not emit irradiation detection light IDL in the third phase PH3. Since irradiation detection light IDL is reflected by the pointing element 780, reflection detection light RDL occurs in the second phase PH2 and the fourth phase PH4. In the present embodiment, the second phase PH2 and the fourth phase PH4 correspond to a first period in claims and the third phase PH3 corresponds to a second period in claims.

The cameras 310 and 320 of the image-capturing unit 300 execute image-capturing in the second phase PH2, the third phase, and the fourth phase in synchronization with apparatus signal light ASL. The cameras 310 and 320 execute image-capturing at the timing according to light-emission of the self-light emitting pointing element 70. In this case, it is preferable that image-capturing is executed at exposure time slightly longer than a pulse width of pointing element signal light PSL. The exposure time is set as described above to thereby make it possible to prevent noise from occurring from other light sources. In the present embodiment, an image captured by the image-capturing unit 300 in an h-th phase (h=1, 2, 3, 4) of a k-th cycle (k=1, 2, 3, 4) is called a captured image Mkh (FIG. 5).

The second phase PH2 and the fourth phase PH4 are position detection phases. In the second phase PH2 and the fourth phase PH4, pointing element signal light PSL emitted by the self-light emitting pointing element 70 and reflection light RDL by the pointing element 780 (self-light emitting pointing element 70 and the non-light-emitting pointing element 80) are included in the image captured by the first cameras 310 and 320. The position detection unit 600 detects the three-dimensional position of the tip of the pointing element 780 (self-light emitting pointing element 70 and non-light-emitting pointing element 80) according to triangulation, based on the image captured by two cameras 310 and 320.

In a case of the self-light emitting pointing element 70, pointing element signal light PSL, which is emitted from the tip light-emitting portion 77 arranged in the tip portion 71 of the self-light emitting pointing element 70, is included in the captured image. For that reason, the three-dimensional position of the tip portion 71 of the self-light emitting pointing element 70 is calculated according to triangulation, based on bright points included in the captured image.

On the other hand, in a case of the non-light-emitting pointing element 80, reflection detection light RDL reflected by the non-light-emitting pointing element 80 is included in the captured image. In two images captured by two cameras 310 and 320, the position of the tip portion 81 of the non-light-emitting pointing element 80 can be determined by using a well known art such as a template matching or a feature extraction method. For example, in a case where the tip portion 81 of the non-light-emitting pointing element 80 which is the finger is recognized by template matching, a plurality of templates relating to the finger are prepared and the tip portion 81 of the finger can be recognized by retrieving a portion suitable for the templates in the image captured by two cameras 310 and 320. The three-dimensional position of the tip portion 81 of the non-light-emitting pointing element 80 is calculated according to triangulation, based on the tip portion 81 recognized by template matching or the like.

The third phase PH3 is a phase at which the pointing element 780 is determined. As described above, the detection light irradiation unit 410 of the interactive projector 100 does not irradiate irradiation detection light IDL in the third phase PH3. For that reason, reflection detection light RDL which is reflection light of irradiation detection light IDL does not occur. On the other hand, since the self-light emitting pointing element 70 emits light according to light emission ID in the third phase PH3 as described above, light emission/non-light emission are different for each cycle. That is, light included in the image captured by the image-capturing unit 300 in the third phase PH3 is pointing element signal light PSL emitted by the self-light emitting pointing element 70. In a case of an example illustrated in FIG. 5, the pen 1 emits light in the third phase PH3 of the first cycle CY1 and the pen 2 emits light in the third phase PH3 of the second cycle CY2. For that reason, for example, in a case where three beams of light (regarding reflection detection light RDL, light of tip portion 81 of non-light-emitting pointing element 80 detected by pattern matching or the like) are included in the image captured in the second phase PH2 and the fourth phase PH4, the position detection unit 600 determines that light of the coordinate, which substantially coincides with the three-dimensional position (coordinates) of light included in the image captured in the third phase PH3 of the first cycle CY1 among the three beams of light, is the three-dimensional position (coordinates) of the pen 1. Here, whether two positions substantially coincide with each other or not is determined according to whether the distance between two points in each of the X, Y, and Z coordinates is within 2 mm or not. In the present embodiment, a threshold value with which it is determined that two positions substantially coincide with each other is set to 2 mm, but is not limited thereto. For example, a small value of approximately 2 mm to 6 mm is preferably used. Similarly, the position detection unit 600 determines that light of the coordinate, which substantially coincides with the three-dimensional position (coordinates) of light included in the image captured in the third phase PH3 of the second cycle CY2, is the three-dimensional position (coordinates) of the pen 2. When the determination of the self-light emitting pointing element 70 is ended, the position detection unit 600 determines that the three-dimensional position of the remaining one beam of light among three beams of light included in the images captured in the second phase PH2 and the fourth phase PH4 is the three-dimensional position of the tip portion 81 of the non-light-emitting pointing element 80. In a case where the button switch 73 of the self-light emitting pointing element 70 is in the ON state, the self-light emitting pointing element 70 emits light in the third phase of the third cycle CY3. Similar to above-description, the position detection unit 600 distinguishes the pen 1 and the pen 2 and determines the ON/OFF of the button switch 73.

The third phase PH3 is also a phase in which contact detection detecting contact of the tip portion 71 of the self-light emitting pointing element 70 with the screen surface SS is performed. As described above, the 4-th bit of the light emission ID of pointing element signal light PSL emitted by the self-light emitting pointing element 70 is the contact flag. Accordingly, it is possible to detect contact of the self-light emitting pointing element 70, based on whether light is included in the image (captured image M43) captured in the third phase PH3 of the fourth cycle CY4 or not. The contact detection unit 800 distinguishes individuals (pen 1 and pen 2) of the self-light emitting pointing element 70 and detects contact thereof based on a result obtained by analyzing the captured images M13, 23, and 43 (FIG. 5) by the position detection unit 600. When it is determined that light is not included in the captured image 43, the contact detection unit 800 determines that both the pen 1 and pen 2 are being non-contacted. In a case where one beam of light is included in the captured image M43, the contact detection unit 800 determines that any one of the pen 1 and pen 2 is being contacted. Specifically, in a case where the three-dimensional position of light included in a captured image M43 substantially coincides with the three-dimensional position of light included in a captured image M13 (third phase of first cycle), the contact detection unit 800 determines that the "pen 1 is being contacted" and the "pen 2 is being non-contacted". On the other hand, in a case where the three-dimensional position of light included in the captured image M43 substantially coincides with the three-dimensional position of light included in a captured image M23 (third phase of second cycle), the contact detection unit 800 determines that the "pen 1 is being non-contacted" and the "pen 2 is being contacted". In a case where two beams of light are included in the captured image 43, it is determined that "both pen 1 and pen 2 are being contacted". As such, the contact detection unit 800 detects contact of the self-light emitting pointing element 70 based on the light emitting pattern (light emission ID) of pointing element signal light PSL emitted by the self-light emitting pointing element 70.

Regarding contact detection of the non-light-emitting pointing element 80, the contact detection unit 800 detects contact according to whether a difference between a Z coordinate value of the tip portion 81 determined by triangulation and a Z coordinate value of a surface of the screen surface SS is equal to or less than a minute tolerance or not, that is, whether the tip portion 81 is sufficiently near the surface of the screen surface SS or not. In the present embodiment, tolerance is set to 2 mm, but is not limited thereto. For example, a small value of approximately 2 mm to 6 mm is preferably used.

When detection of the three-dimensional position and contact detection of the tip portion of the pointing element 780 and the ON/OFF determination of the button switch 73 are ended, the control unit 700 determines an instruction content by the pointing element 780 (self-light emitting pointing element 70 and non-light-emitting pointing element 80) based on the detection results of the position detection unit 600 and the contact detection unit 800, causes the projection image generation unit 500 to generate an image according to the instruction content, and causes the projection unit 200 to project the image according to the instruction content on the screen surface SS. For example, in a case where the tip switch 76 or the button switch 73 becomes ON in a state where the position of the XY coordinates of the tip portion 71 is present on any one of buttons within the toolbox TB (FIG. 2B), a tool of the button is selected. As illustrated in the example of FIG. 2B, in a case where the tip switch 76 or the button switch 73 becomes ON in a state where the XY coordinates of the tip portion 71 is present in a position other than the toolbox TB within the projected screen PS, processing (for example, rendering) by the selected tool is selected. The control unit 700 causes the projection image generation unit 500 to render a preselected pointer or a mark, using the XY coordinates $(X_{71}, Y_{71})$ of the tip portion 71 of the self-light emitting pointing element 70 and the XY coordinates $(X_{81}, Y_{81})$ of the tip portion 81 of the non-light-emitting pointing element 80, such that the pointer or the mark is arranged at the positions $(X_{71}, Y_{71})$ and $(X_{81}, Y_{81})$ within the projected screen PS. The control unit 700 executes processing according to the content instructed by the self-light emitting pointing element 70 and the non-light-emitting pointing element 80 and causes the projection image generation unit 500 to render an image including the processing result.

As described above, in the present embodiment, contact detection of the self-light emitting pointing element 70 is performed based on the light emitting pattern of pointing element signal light PSL emitted by the self-light emitting pointing element 70. The three-dimensional position of the tip portion 71 of the self-light emitting pointing element 70 can be obtained by triangulation using the images captured by two cameras 310 and 320 and thus, it is possible to execute contact detection of the tip portion 71 of the self-light emitting pointing element 70 using the three-dimensional position. However, since the pointing element signal light PSL emitted by the self-light emitting pointing element 70 is reflected by the screen surface SS in a state where the self-light emitting pointing element 70 is in contact with the screen surface SS, there is a tendency that detection accuracy of the Z coordinate of the tip position of the self-light emitting pointing element 70 by triangulation becomes lower compared to the non-light-emitting pointing element 80. In contrast, according to the interactive projector 100 of the present embodiment, since contact detection of the self-light emitting pointing element 70 is performed based on the light emitting pattern of pointing element signal light PSL emitted by the self-light emitting pointing element 70, it is possible to execute more accurately contact detection of the self-light emitting pointing element 70.

A3. Another Example

Figure 6:
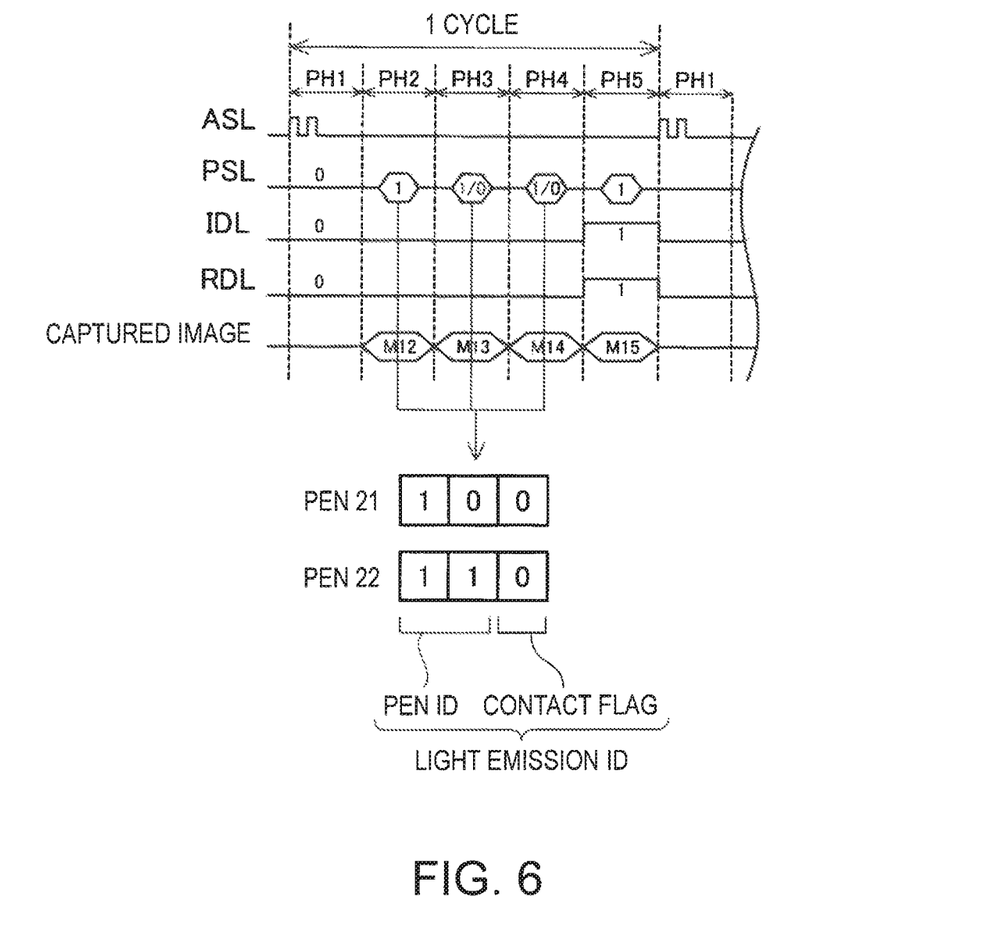
FIG. 6 is a timing chart illustrating another example of the light emission timings of the projector and the pointing element.

FIG. 6 is a timing chart illustrating another example of the light emission timing of the projector and the pointing element. In a sequence illustrated in FIG. 6, one cycle includes five phases of a first phase PH1 to a fifth phase PH5. In this example, the first phase PH1 to the fifth phase PH5 are executed once to thereby make it possible to distinguish the plurality of self-light emitting pointing elements 70 and non-light-emitting pointing elements 80 to specify positions thereof and also make it possible to distinguish the plurality of self-light emitting pointing elements 70 and detect contact thereof. In this example, a configuration in which the self-light emitting pointing element 70 does not include the button switch 73 in the example described above is illustrated. In FIG. 6, an example in which a pen 21 and a pen 22 are used as the self-light emitting pointing element 70 is illustrated. A pen ID of the pen 21 is "10" and the pen ID of the pen 22 is "11". A pattern obtained by adding a contact flag (non-contact="0", contact="1") to the pen ID is set as the light emitting pattern (light emission ID) described above. The self-light emitting pointing element 70 emits light according to a set light emission ID in the second phase PH2 to the fourth phase PH4. The cameras 310 and 320 of the image-capturing unit 300 execute image-capturing in synchronization with apparatus signal light ASL, in the second phase PH2 to the fifth phase PH5. In FIG. 6, a case where the contact flag is "0" is illustrated.

In this example, the second phase PH2 is a phase in which the distinction of the self-light emitting pointing element 70 and the non-light-emitting pointing element 80 is performed. For example, in a case where light is included in a captured image M12 captured in the second phase PH2 and also in a captured image M15 captured in the fifth phase PH5, the position detection unit 600 determines that light included in the captured image M15 is reflection detection light RDL by the self-light emitting pointing element 70. On the other hand, in a case where light is not included in the captured image M12 and light is included in the captured image M15, the position detection unit 600 determines that light included in the captured image M15 is reflection detection light RDL by the non-light-emitting pointing element 80.

The third phase PH3 is a phase in which distinction of the pen 21 and the pen 22 is performed. As described above, in the third phase PH3, the pen 21 does not emit light and the pen 22 emits light. For that reason, for example, in a case where both the pen 21 and the pen 22 are used, the three-dimensional positions (coordinates) of bright points included in the captured image M13 and the three-dimensional positions (coordinates) of bright points included in the captured image M15 are compared to each other to thereby make it possible to perform distinction of the pen 21 and the pen 22.

The fourth phase PH4 is a phase in which contact detection detecting contact of the tip portion 71 of the self-light emitting pointing element 70 with the screen surface SS is performed. Similar to the example described above, it is possible to detect contact. The fifth phase PH5 is a position detection phase. Similar to the example described above, it is possible to detect the three-dimensional position. As such, in this example, the first phase PH1 to the fifth phase PH5 are executed once (one cycle) so as to make it possible to distinguish the pointing element 780 (pen 21, pen 22, and non-light-emitting pointing element 80) and detect the three-dimensional position and contact.

B. Modification Example

The invention is not limited to the embodiments and examples described above and can be embodied by various forms in a range without departing from a gist thereof, and for example, the following modification may also be possible.

Modification Example 1

In the embodiment described above, the 4-bit light emission ID is exemplified as the light emitting pattern (light emission ID) of pointing element signal light PSL emitted by the self-light emitting pointing element 70, but the light emitting pattern of the pointing element signal light PSL is not limited to the embodiment described above and a configuration in which a plurality of self-light emitting pointing elements 70 are identified to thereby make it possible to determine contact/non-contact may also be adopted. In the embodiment described above, determination of position detection and contact of the pointing element 780 is executed based on the image captured according to the sequence illustrated in FIG. 5, but is not limited to the sequence illustrated in FIG. 5. For example, the fourth phase PH4 may be omitted.

Modification Example 2

In the embodiment described above, although the image-capturing unit 300 is made to include two cameras 310 and 320, the image-capturing unit 300 may be made to include three or more cameras. In the latter case, the three-dimensional coordinates (X, Y, and Z) may be determined based on m (m is an integer of 3 or more) images captured by m cameras. For example, $_mC_2$ combinations obtained by arbitrarily selecting two images from m images may be used to obtain respective three-dimensional coordinates to determine the final three-dimensional coordinate using an average of the three-dimensional coordinates. Then, it is possible to further increase detection accuracy of the three-dimensional coordinates.

Modification Example 3

In the embodiment described above, although the interactive projection system 900 is made operable in the whiteboard mode and PC interactive mode, the system may be configured to be operated at only one mode among the modes. The interactive projection system 900 may be configured to operate at a mode other than the two modes and also, may be configured to operate at a plurality of modes including the two modes.

Modification Example 4

In the embodiment described above, although all of irradiation detection light IDL, reflection detection light RDL, apparatus signal light ASL, and pointing element signal light PSL illustrated in FIG. 3 are set as near-infrared light, some or all of these may be light other than near-infrared light.

Modification Example 5

In the embodiment described above, although the projection screen is projected on a plane screen plate 920, the projection screen may also be projected on a curved screen. Also, in this case, the three-dimensional position of the tip portion of the pointing element can be determined by using triangulation using the image captured by two cameras and thus, it is possible to determine a positional relationship between the tip portion of the pointing element and the projection screen.

Modification Example 6

In the embodiment described above, although a configuration in which the interactive projector 100 includes the detection light irradiation unit 410 is exemplified, a configuration in which the interactive projector 100 does not include the detection light irradiation unit 410 may also be adopted. In a case where the interactive projector 100 does not include the detection light irradiation unit 410, the support member 910 or the like may have a configuration in which irradiation detection light, which is for detecting the tip of the non-light-emitting pointing element 80, with which the screen surface SS and a portion across space ahead thereof are irradiated. Both the two cameras 310 and 320 may be configured to have an image-capturing function of receiving light including visible light so as to capture an image or configured to detect the tip of the non-light-emitting pointing element 80 based on a captured image obtained by receiving light including visible light and capturing an image.

As described above, although the embodiment of the invention is described based on several examples, the embodiment described above is made to easily and readily understand the invention and is not intended to limit the invention. It is needless to say that the invention may be modified and improved without departing from a gist thereof and claims and equivalents to claims are included in the invention.

The entire disclosure of Japanese Patent Application No. 2015-065669, filed Mar. 27, 2015 is expressly incorporated by reference herein.

REFERENCE SIGNS LIST

70: self-light emitting pointing element
71: tip portion
72: shaft portion
73: button switch
74: signal light reception unit
75: control unit
76: tip switch
77: tip light-emitting portion
80: non-light-emitting pointing element
81: tip portion
100: interactive projector
200: projection unit
210: projection lens
220: optical modulation unit
230: light source
300: image-capturing unit
310: first camera
320: second camera
410: detection light irradiation unit
430: signal light transmission unit
500: projection image generation unit
510: projection image memory
600: position detection unit
700: control unit
900: interactive projection system
910: support member
920: screen plate

The invention claimed is:

1. An interactive projector receiving an instruction by a pointing element of a user with respect to a projected screen, wherein the interactive projector simultaneously uses both of a self-light emitting pointing element including a light-emitting portion which emits pointing element signal light in different light emitting patterns between at the time of contacting the projected screen and at the time of non-contacting the projected screen and a non-light-emitting pointing element which does not include the light-emitting portion as the pointing element, the interactive projector comprising:
   a projection lens that projects the projected screen on a screen surface;
   a detection light irradiation unit that irradiates the projected screen with detection light used for detection of the non-light-emitting pointing element; and
   a plurality of cameras that include a first camera and a second camera that receive light in a wavelength region including wavelengths of the pointing element signal light and the detection light and capture an image of an area of the projected screen, wherein
   the interactive projector
      detects a three-dimensional position of the pointing element with respect to the projected screen based on a plurality of images which are captured by the plurality of cameras, the plurality of images including the pointing element,
      detects contact of the self-light emitting pointing element with the projected screen based on the light emitting pattern,
      detects contact of the non-light-emitting pointing element with the projected screen based on the three-dimensional position detected, and
      determines the self-light emitting pointing element and the non-light-emitting pointing element based on a first image captured in a first period during which a first state of the detection light irradiation unit and a second state of the light-emitting portion are different.

2. The interactive projector according to claim 1, wherein the detection light irradiation unit intermittently irradiates the projected screen with detection light, and
   the interactive projector determines the self-light emitting pointing element and the non-light-emitting pointing element based on the first image captured in the first period during which irradiation of the detection light is not performed and a second image captured in a second period during which irradiation of the detection light is performed.

3. An interactive projection system comprising:
   the interactive projector according to claim 1;
   a screen that includes the screen surface on which the projected screen is projected; and
   the self-light emitting pointing element that includes the light-emitting portion which emits the pointing element signal light in the different light emitting patterns between at the time of contacting the projected screen and at the time of non-contacting the projected screen.

4. A control method of an interactive projector receiving an instruction by a pointing element of a user with respect to a projected screen, wherein the interactive projector simultaneously uses both of a self-light emitting pointing element including a light-emitting portion which emits pointing element signal light in different light emitting patterns between at the time of contacting the projected screen and at the time of non-contacting the projected screen and a non-light-emitting pointing element which does not include the light-emitting portion as the pointing element, the control method comprising:

projecting the projected screen on a screen surface, irradiating, by a detection light irradiation unit, the projected screen with detection light used for detection of the non-light-emitting pointing element, receiving, by a plurality of cameras including a first camera and a second camera, light in a wavelength region including wavelengths of the pointing element signal light and the detection light and capturing an image of an area of the projected screen, detecting a three-dimensional position of the pointing element with respect to the projected screen based on a plurality of images which are captured by the plurality of cameras, the plurality of images including the pointing element, detecting contact of the self-light emitting pointing element with the projected screen based on the light emitting pattern, detecting contact of the non-light-emitting pointing element with the projected screen based on the three-dimensional position detected, and determining the self-light emitting pointing element and the non-light-emitting pointing element based on a first image captured in a first period during which a first state of the detection light irradiation unit and a second state of the light-emitting portion are different.

* * * * *